US008819384B1

(12) United States Patent
Gauba

(10) Patent No.: US 8,819,384 B1
(45) Date of Patent: Aug. 26, 2014

(54) METHOD AND SYSTEM FOR EMBEDDED VIRTUAL MEMORY MANAGEMENT

(75) Inventor: Deepak Kumar Gauba, Boise, ID (US)

(73) Assignee: Marvell International Ltd., Hamilton (BM)

( * ) Notice: Subject to any disclaimer, the term of this patent is extended or adjusted under 35 U.S.C. 154(b) by 773 days.

(21) Appl. No.: 12/121,332

(22) Filed: May 15, 2008

Related U.S. Application Data

(60) Provisional application No. 60/938,514, filed on May 17, 2007.

(51) Int. Cl.
*G06F 12/00* (2006.01)

(52) U.S. Cl.
USPC .......................................... 711/202; 711/170

(58) Field of Classification Search
USPC .................................. 711/202, 170
See application file for complete search history.

(56) References Cited

U.S. PATENT DOCUMENTS

| | | | |
|---|---|---|---|
| 5,835,760 A * | 11/1998 | Harmer .............................. 713/2 |
| 6,711,059 B2 * | 3/2004 | Sinclair et al. ............ 365/185.11 |
| 6,738,887 B2 * | 5/2004 | Colpo et al. ................... 711/202 |
| 6,952,368 B2 * | 10/2005 | Miura et al. ............. 365/185.11 |
| 7,065,630 B1 * | 6/2006 | Ledebohm et al. ............ 711/206 |
| 7,065,769 B1 * | 6/2006 | Tolopka ........................ 719/321 |
| 2002/0091919 A1 * | 7/2002 | Goodman et al. ................ 713/2 |
| 2002/0129233 A1 * | 9/2002 | Hillis et al. ........................ 713/2 |
| 2005/0033954 A1 * | 2/2005 | Wang et al. ....................... 713/2 |
| 2006/0002352 A1 * | 1/2006 | Nakamura .................... 370/338 |
| 2006/0095649 A1 * | 5/2006 | Netter et al. .................. 711/103 |
| 2006/0161767 A1 * | 7/2006 | Wang et al. .................... 713/100 |
| 2007/0155422 A1 * | 7/2007 | Johansen et al. ........... 455/556.1 |
| 2007/0274230 A1 * | 11/2007 | Werber et al. ................. 370/254 |

* cited by examiner

*Primary Examiner* — Gurtej Bansal

(57) ABSTRACT

Aspects of the disclosure provide a virtual memory management method that can reduce memory requirement and improve system performance. The method can include detecting a scenario, matching the detected scenario with a predefined scenario that includes a pre-set mapping relationship of a first module to a dynamic memory address within a first portion of a dynamic memory, and writing the first module from a static memory to the first portion of the dynamic memory at the dynamic memory address. Further, the method can include executing the first module from the dynamic memory. In addition, the method can include storing a second module at a second portion of the dynamic memory independent of the detected scenario.

30 Claims, 5 Drawing Sheets

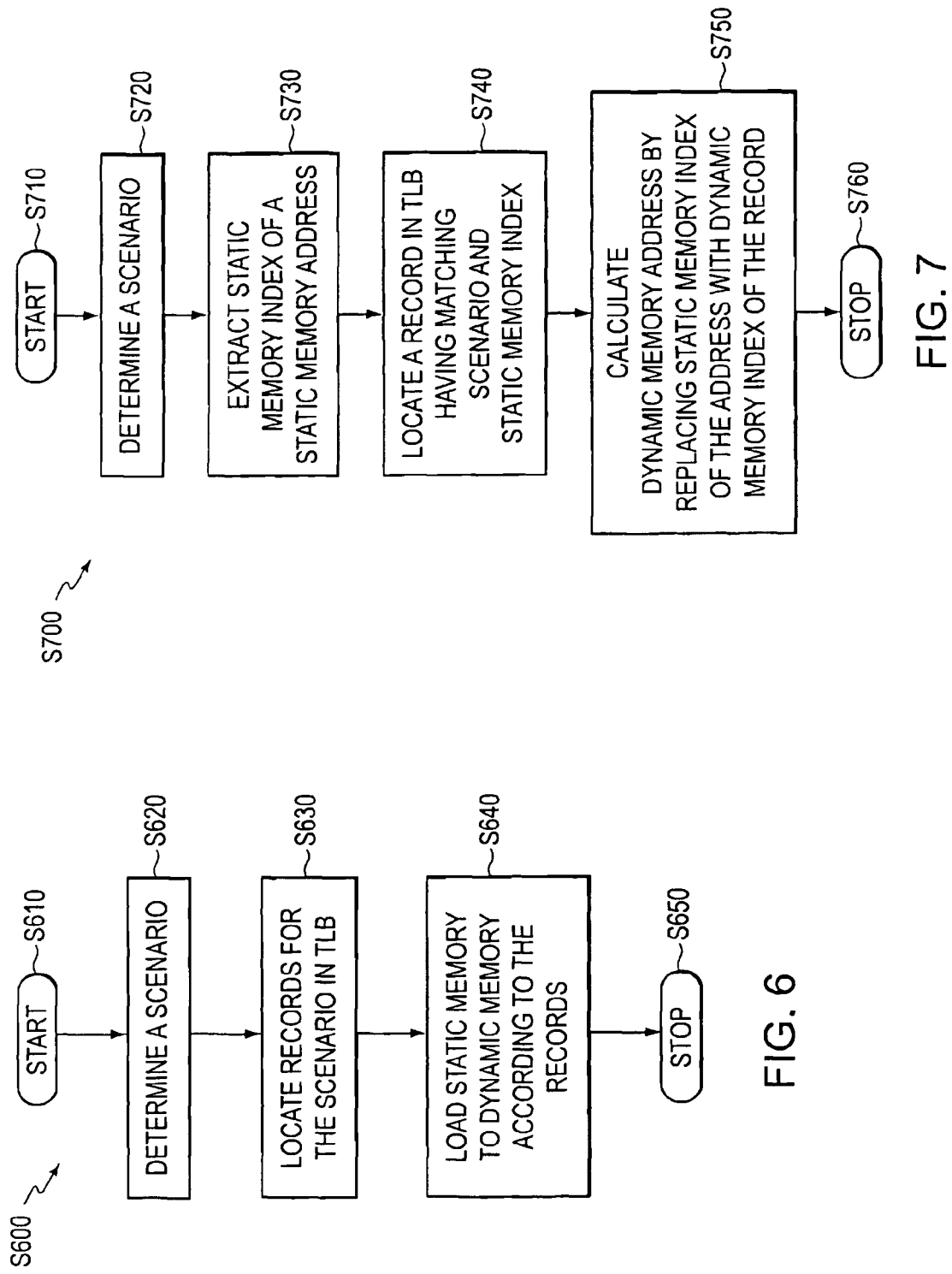

METHOD AND SYSTEM FOR EMBEDDED VIRTUAL MEMORY MANAGEMENT

INCORPORATION BY REFERENCE

This application claims the benefit of U.S. Provisional Application No. 60/938,514, "EMBEDDED VIRTUAL MEMORY MANAGER" filed on May 17, 2007, which is incorporated herein by reference in its entirety.

BACKGROUND

An embedded system may require a large amount of random access memory (RAM) during operation. For example, a laser printer system may require a large RAM to buffer raster page data for at least two pages to provide features, such as jam recovery, during operation. However, a low RAM system may be preferred by the market due to low price. For example, a microprocessor having 8 MB on chip RAM can be used in a laser printer system. When the laser printer system requires more than 8 MB RAM to run applications, external RAM chips may be required to be coupled with the microprocessor on a printed circuit board (PCB), which increases cost and footprint. Therefore, a laser printer system that can run the applications with the 8 MB on chip RAM can be preferred.

SUMMARY

Generally, an embedded system can use a linear memory management or a virtual memory management. The linear memory management may load all the application and system code modules into the memory, and thus it can be difficult to reduce memory size. On the other hand, the virtual memory management can swap modules in the memory. However, existing virtual memory management system may require complex address computations that may affect the embedded system performance.

Aspects of the disclosure can provide a virtual memory management method that can reduce memory requirement and improve system performance. The method can include detecting a scenario, matching the detected scenario with a predefined scenario that includes a pre-set mapping relationship of a first module to a dynamic memory address within a first portion of a dynamic memory, and writing the first module from a static memory to the first portion of the dynamic memory at the dynamic memory address.

According to an aspect of the disclosure, the pre-set mapping relationship can map a static memory address within the static memory with the dynamic memory address within the first portion of the dynamic memory. Therefore, to write the module from the static memory to the dynamic memory, the method can further include copying data stored at the static memory address within the static memory to the dynamic memory at the dynamic memory address.

Further, the method can also include executing the first module from the dynamic memory. To execute the module from the dynamic memory, the method can include matching the scenario with the predefined scenario that includes the pre-set mapping relationship of the module to the dynamic memory address within the dynamic memory, and executing the first module stored within the dynamic memory at the dynamic memory address.

In addition, the method can also include storing a second module at a second portion of the dynamic memory independent of the detected scenario. According to aspects of the disclosure, the static memory can be at least one of read only memory (ROM), programmable ROM (PROM), flash PROM, electrical erasable PROM (EEPROM), magnetic storage, optical storage and battery backup random access memory (RAM). Further, the dynamic memory can be at least one of DRAM and SRAM.

Aspects of the disclosure can also provide a method of manufacturing a computer system. The method can include identifying a scenario, determining a module that is associated to the identified scenario, establishing a mapping relationship of the module to a dynamic memory address within a dynamic memory, storing the scenario and the mapping relationship as a predefined scenario in a memory medium, and including the memory medium with the computer system.

The disclosure can also provide a memory management system. The memory management system can include a static memory that is configured to store a first module at a static memory address, a dynamic memory that is configured to have a first portion that stores the first module in a scenario, and a controller that is configured to detect the scenario, match the detected scenario with a predefined scenario that includes a pre-set mapping relationship of the first module to a dynamic memory address within the first portion of the dynamic memory, and write the first module from the static memory to the first portion of the dynamic memory at the dynamic memory address.

In addition, the disclosure can provide a computer system that includes the memory management system, and a CPU. The CPU is configured to execute the first module from the dynamic memory. Further, the disclosure can provide a device including the computer system, and a device specific component. The device specific component can be coupled with the CPU and can be configured to execute a device specific function under control of the CPU.

BRIEF DESCRIPTION OF THE DRAWINGS

Various exemplary embodiments of this disclosure will be described in detail with reference to the following figures, wherein like numerals reference like elements and wherein:

FIG. 6 shows a flow chart outlining an exemplary dynamic memory updating process; and FIG. 7 shows a flow chart outlining an exemplary address translation process.

DETAILED DESCRIPTION OF EMBODIMENTS

Figure 1:
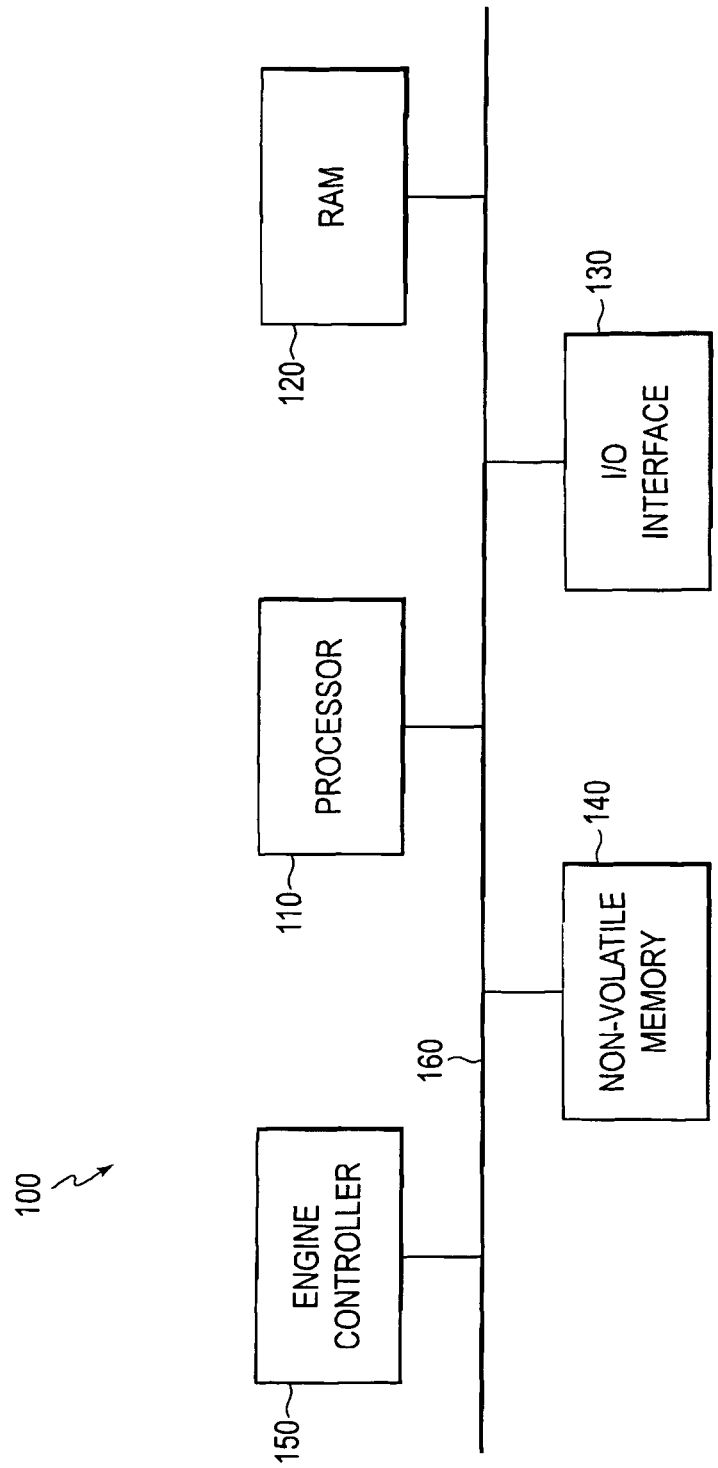
FIG. 1 shows a block diagram of an exemplary embedded system.

FIG. 1 shows a block diagram of an exemplary embedded system 100 according to the disclosure. The embedded system 100 can include a processor 110, a random access memory (RAM) 120, an I/O interface 130, and a non-volatile memory 140. In addition, the embedded system 100 may include a device specific component. For example, the exemplary embedded system 100 used in a laser printer may include an engine controller 150 that can control a printer engine. Generally, the processor 110 can execute codes from the memory 120 or 140, communicate with external system or device via I/O interface 130, and instruct the device specific component to perform a specific function.

More specifically, the processor 110 can execute system codes to maintain an appropriate status of the embedded system 100. Further, the processor 110 can execute application codes to control the embedded system 100 to perform specific function. The non-volatile memory 140 can hold information even when power is off. Therefore, the non-volatile memory 140 can be used to store system and application codes, such as firmware. The RAM 120 is readable and writable. Generally, the RAM 120 can have fast access speed. It can be preferred that data and codes are stored in the RAM 120 during operation, such that the processor 110 can access the RAM 120 for codes and data instead of the non-volatile memory 140. Thus, the system performance can be improved. The I/O interface 130 can be a communication interface that can enable the embedded system 100 to communicate with external devices or systems.

During operation, the processor 110 can execute system codes in the non-volatile memory 140 or RAM 120 to maintain the embedded system in an appropriate status. Further, the processor 110 can monitor I/O interface 130, and response to requests of the external system or devices. The I/O interface 130 may receive a signal from an external system to request the embedded system 100 to perform a specific function. For example, a laser printer system may receive a signal requesting to print a page. The processor 110 can then execute application codes in the non-volatile memory 140 or RAM 120 and control the device specific component to perform the requested specific function. For example, the processor 110 of the laser printer system may receive data from the I/O interface 130 and control the engine controller 150 to print the page according to the data received.

It should be understood that the embedded system 100 may include more than one processor 110. Further, the non-volatile memory 140 may include various non-volatile memory devices, such as battery backup RAM, read only memory (ROM), programmable ROM (PROM), flash PROM, electrical erasable PROM (EEPROM), magnetic storage, optical storage, and the like. Some non-volatile memory 140 can be updated, such as various types of PROM. The RAM 120 may also include various RAM devices, such as DRAM, SRAM, and the like. The I/O interface 130 can include various communication interfaces, such as universal serial bus (USB), Ethernet, IEEE 1394, and the like. In addition, the I/O interface 130 may include wireless communication standards, such as radio frequency, satellite, optical, and the like.

It should be understood that the components of the embedded system 100 may be integrated on a chip. For example, a portion of the RAM 120, such as 8 MB, may be integrated with the processor 110 on a chip.

Further, the embedded system 100 may include a bus 160 that can couple various components of the embedded system 100 together, and cooperate operations of the various components. For the ease and clarity of description, the embodiments are presented with a bus type architecture, however, it should be understood that any other architectures can also be used to couple components inside an embedded system.

In a preferred working configuration, the system and application codes can be stored in the non-volatile memory 140 before power is up. After power is up, the system and application codes can be loaded from the non-volatile memory 140 into the RAM 120, so that the processor 110 can access the RAM 120 to execute system and application codes. This working configuration can have high performance due to the high access speed of the RAM 120.

In addition to store system and application codes during operation, the RAM 120 of the embedded system 100 may store a large amount of run time data, such as in a high resolution laser printer system. To ensure page printing successful, the high resolution laser printer system can store raster page data of a whole page in the RAM 120 before page printing starts. Further, a jam recovery feature may be preferred to release a user from sending data again when printer jam happens. To implement the jam recovery feature, the RAM 120 can be required to store raster page data of at least two pages. Therefore, it may be required that a large portion of the RAM 120 is allotted to run time data, which may result in not enough memory space in the RAM 120 to store all the system and application codes during operation. For example, a low cost high performance printer system may be required to operate with 8 MB RAM 120, which can be integrated with the processor 110 on a chip. Among the 8 MB memory space, 4 MB can be required for storing run time data, such as raster page data; and 1 MB can be required for operating system usage, such as stacks, and buffers. Therefore, 3 MB can be left for storing system and application codes, which may be not enough to store all the system and application codes at the same time.

Generally, virtual memory management can be used to virtually extent memory space. However, virtual memory management may need complicated address computations, which can lower the embedded system performance. The disclosure can provide a virtual memory management method that can support high embedded system performance.

Figure 2:
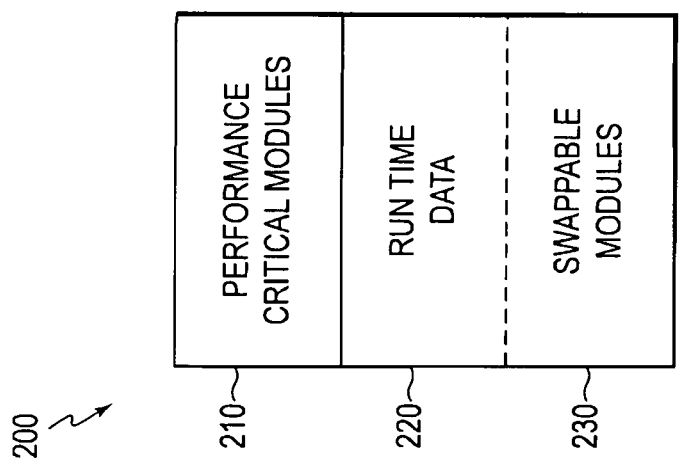
FIG. 2 shows an exemplary memory allocation map.

FIG. 2 shows an exemplary memory allocation map according to the disclosure. The exemplary memory 200, such as the RAM 120, can include a performance critical module portion 210, a run time data portion 220, and a swappable module portion 230. It should be understood that while the exemplary memory allocation map is continuous for a portion, such continuity is not required. In other words, each portion can include memory locations that are not continuous or discrete.

The performance critical module portion 210 can be allocated to application and system codes, generally in the form of modules, which can be critical to the embedded system performance. Once a performance critical module is loaded into a location in the performance critical module portion 210, the performance critical module can stay at the location in the memory as long as the embedded system 100 is powered on. Therefore, the processor 110 can access the same location of the memory to execute the performance critical module each time the module is executed. For example, modules that are often executed by the embedded system 100 can be performance critical modules, such as data decompression module and engine control module in a laser printer system. Data decompression module can be executed quite often to decompress page data to feed printer engine, and the engine control module can be executed quite often to determine status of the engine and send control signals to the engine controller 160. Therefore, it can be preferred that those modules can stay in the RAM 120, otherwise continually loading those modules may occupy too much bus bandwidth, and delay other operations, then harm system performance.

On the other hand, the swappable module portion 230 can be allotted to modules that are executed occasionally, such as communication protocol modules. Generally, a specific communication protocol may be required in a scenario by the embedded system 100 to communicate with an external system or device via a specific communication channel. Therefore, it may be preferred that modules of the specific communication protocol are in the memory, while modules of other communication protocols stay out of the memory to save memory space in the scenario. For example, in a scenario that instructions or data are coming from Ethernet, Ethernet module can be required, while USB module may have no use. Then, USB module can be swapped out of the RAM 120. In another scenario that instructions or data are coming from USB, USB module can be required, while Ethernet module may have no use. Then, Ethernet module can be swapped out of the RAM 120.

In addition, the swappable module portion 230 may have variable size due to the reason that modules required for different scenarios may have different sizes. Further, the rest of the memory 200 excluding the performance critical portion 210 and the swappable module portion 230 can be allocated to the run time data portion 220 to store run time data, such as raster page data. In order to swap modules in and out of the RAM 120 correctly and efficiently, a virtual memory management system may be required.

Figure 3:
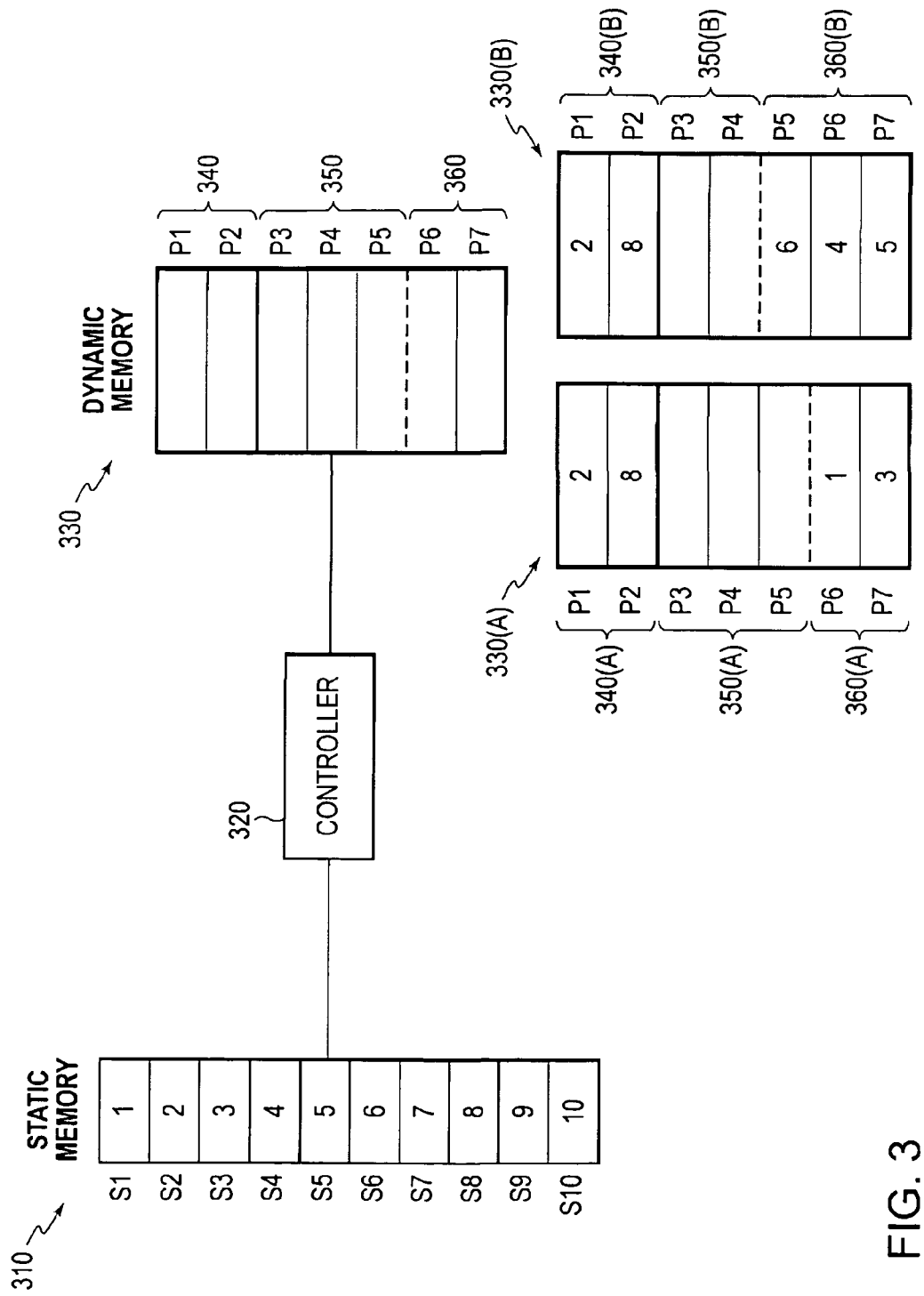
FIG. 3 shows an exemplary virtual memory management system.

FIG. 3 shows an exemplary virtual memory management system according to the disclosure. The exemplary virtual memory management system 300 can include a static memory 310, a dynamic memory 330, and a controller 320 that is coupled with the static memory 310 and the dynamic memory 330. Generally, the static memory 310, such as the non-volatile memory 140, can hold information substantially static during operation. In other words, data and address seldom change in the static memory 310. As shown in FIG. 3, the static memory 310 in the exemplary virtual memory management system can hold modules 1-10 at their respective addresses during the operation.

On the other hand, the dynamic memory 330, such as the RAM 120, may change dynamically during operation. Similar to FIG. 2, the dynamic memory 330 can include a performance critical module portion 340, a run time data portion 350, and a swappable module portion 360 according to the disclosure. Therefore, run time data can be stored in the run time data portion 350. Modules that are critical to the embedded system performance can stay in the performance critical module portion 340, without continuous loading. The swappable module portion 360 may hold different modules in different scenarios.

The controller 330 can detect a scenario, and determine modules and their locations in the dynamic memory 330 in the scenario. Further, the controller 330 can load the modules from the static memory 310 to the respective locations in the dynamic memory 330. It should be understood that the controller 330 can be a software implemented component, which can be executed by the processor 110.

FIG. 3 also shows exemplary profiles 330(A) and 330(B) of the dynamic memory 330 in scenarios A and B. As can be seen, the performance critical module portion 340 can hold the same modules, such as modules 2 and 8, independent of scenarios, as shown by 340(A) and 340(B). Initially, the controller 320 can determine the performance critical modules, and load those modules in the performance critical module portion 340. Afterwards, the performance critical modules can stay in the dynamic memory 330 at the same location independent of scenarios. The processor 110 can access the performance critical modules at the same location in the dynamic memory 330 every time the performance critical modules are executed. Therefore, system performance can be sustained.

On the other hand, the swappable module portion 360 can hold different modules in different scenarios, as shown by 360(A) and 360(B). A scenario can be detected by the controller 320. Further, the controller 320 can determine which modules can be required for the scenario. For example, when page data is coming from Ethernet, the controller 320 can detect an Ethernet communication scenario, which can be represented by scenario A in FIG. 3. Further, the controller 320 can determine that modules 1 and 3, which can be Ethernet protocol modules, can be required. Then the controller 320 can load the modules 1 and 3 from the static memory 310 into the swappable module portion 360 for the processor 110 to execute.

Moreover, the controller 320 may detect and control scenario changes, and can load modules into the swappable module portion 360 accordingly. For example, while data is coming from the Ethernet, an interrupt signal may come from USB, the processor 110 may need to handle the interrupt from USB according to USB protocol. The controller 320 can detect that a USB communication scenario, which can be represented by scenario B, happens. Further, the controller 320 can determine that modules 4, 5 and 6, which can be USB protocol modules, can be required. Then the controller 320 can load the modules 4, 5 and 6 from the static memory 310 into the swappable module portion 360 for the processor 110 to access and handle the USB interrupt. The modules 4 and 5 may occupy locations of the swappable module portion 360 that are previously occupied by modules 1 and 3, for example, indicated by P6 and P7 as shown by 360(A) and 360(B). The module 6 may occupy memory locations that are previously allocated to the run time data portion, for example, indicated by P5 in FIG. 3.

Further, the controller 320 may also determine job priority, and load modules into the swappable portion accordingly. For example, the USB interrupt may indicate another printing job is coming from USB. The controller 320 may decide to prioritize Ethernet printing job before USB printing job. Therefore, the controller 320 can instruct the USB communication channel to hold, and resume Ethernet printing. According to Ethernet communication scenario, the controller 320 can load modules 1 and 3, which are Ethernet protocol modules, in the swappable module portion 360 again. After the Ethernet printing job is done, the controller 320 can determine to print from the USB. According to the USB communication scenario, the controller 320 can load modules 4, 5 and 6, which are USB protocol modules, in the swappable module portion 360. Then the controller 320 can instruct the USB communication channel to send page data.

As can be seen, the swappable module portion 360 of the dynamic memory 330 may include different modules for different scenarios. Therefore, an address translation technique can be required for the controller 320 to load a module from the static memory 310 to a location of the dynamic memory 330. Further, when the processor 110 needs to execute the module, the address translation technique can be required to locate the module in the dynamic memory 330 for the processor 110 to execute the module.

To avoid complex computation, which can harm system performance, a hard coded translation lookaside buffer (TLB) is suggested by the disclosure. The hard coded TLB can be determine during design and manufacture of the embedded system 100. During the design and manufacture, various operation scenarios can be identified. Then modules that may be required for the identified scenarios can be determined. Further, each module can be assigned a dynamic memory address. Therefore, predefined scenarios, which can include pre-set mapping relationships of modules to dynamic memory addresses, can be included with the embedded system 110. During operation, the predefined scenario can be loaded into a buffer of the operating system to provide a hard coded TLB.

Figure 4:
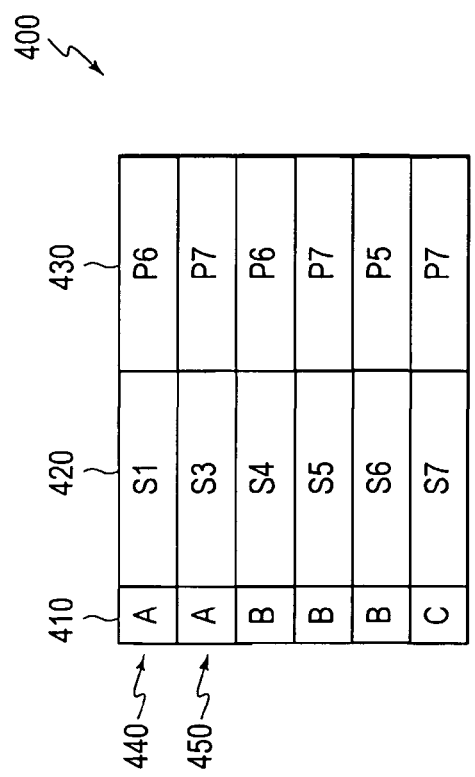
FIG. 4 shows an exemplary hard coded translation lookaside buffer (TLB)

FIG. 4 shows an exemplary hard coded TLB 400 in a table form. The exemplary hard coded TLB table 400 can be saved in a non-volatile memory, such as non-volatile memory 140. In addition, the exemplary hard coded TLB table 400 can be updated with a firmware update. For example, when modules supporting Microsoft WSD are added in the firmware, the exemplary hard coded TLB table 400 can be updated accordingly. The exemplary hard coded TLB table 400 can be loaded into an operating system buffer during operation to improve system performance.

The exemplary hard coded TLB table 400 can include a scenario ID field 410, a static memory field 420, and a dynamic memory field 430. The scenario ID field 410 can include a number that can represent a pre-identified scenario. For example, number A can represent Ethernet communication scenario, and number B can represent USB communication scenario. The static memory field 420 may hold information, such as static memory sector index, that can locate a module in the static memory 310. For example, as shown in FIG. 3, the static memory 310 can be divided into 10 sectors to hold 1-10 modules respectively, each sector can have a static memory sector index, such as S1-S10. In a case that the static memory 310 is addressed by 32 bits, each 1 KB sector can be indexed by the 22 most significant bits (MSB) of the static memory address.

Similarly, the dynamic memory field 430 may hold information, such as dynamic memory sector index, that can locate a module in the dynamic memory 330. For example, as shown in FIG. 3, the dynamic memory 330 can be divided into 7 sectors, each sector can have a sector index, such as P1-P7. In a case that an 8 MB dynamic memory 330 is addressed by 23 bits, each 1 KB sector can be indexed by the 13 MSB of the dynamic memory address.

As can be seem in FIG. 4, each record of the exemplary hard coded TLB can indicate a mapping relationship of a static memory sector to a dynamic memory sector in a specific scenario. The hard coded TLB can facilitate the controller 320 to load required modules for a scenario into the swappable module portion 360 of the dynamic memory 330. For example, record 440 can indicate a mapping relationship of static memory sector S1 to dynamic memory sector P6 for scenario A, and record 450 can indicate a mapping relationship of static memory sector S3 to dynamic memory sector P7 for scenario A. Therefore, in scenario A, the controller 320 can load static memory sectors S1 and S3, which hold modules 1 and 3, into dynamic memory sectors P6 and P7 according to records 440 and 450 respectively.

FIG. 6 shows a flow chart outlining an exemplary dynamic memory updating process. The process starts in step S610, and proceeds to step S620 where the controller 320 can detect a scenario. For example, an interrupt signal is coming from USB while the laser printer is printing a job from the Ethernet, and the processor 110 may need to handle the USB interrupt signal. The controller 320 can detect a USB communication scenario, which may require to execute USB protocol modules that are not in the dynamic memory 330 at the time. Therefore, the dynamic memory 330 may need to be updated.

Then the process proceeds to step S630, where the controller 320 can locate records having matching scenario in a hard coded TLB, such as the exemplary hard coded TLB table 400. The hard coded TLB may include records that can indicate a mapping relationship of static memory to dynamic memory for the detected scenario, such as the exemplary hard coded TLB table 400.

Subsequently, the process proceeds to step S640, where the controller 320 can load the static memory contents into the dynamic memory according to the records. For example, the controller 320 can copy a static memory sector into a mapping dynamic memory sector according to a record in FIG. 4. Therefore, modules that are required in the detected scenario can be copied from the static memory 310 to the dynamic memory 330, and the modules can be executed from the dynamic memory 330, which can improve system performance. Then the process proceeds to step S650, and terminates.

During operation of the embedded system, the processor 110 may need to execute a code of a module in the swappable module portion of the dynamic memory 330. Generally, a static memory address of the code can be available. The static memory address of the code can be translated into a dynamic memory address by the controller 320 according to the hard coded TLB. Therefore, the code address in the dynamic memory can be located, and the processor 110 can execute the code from the dynamic memory address.

Figure 5:
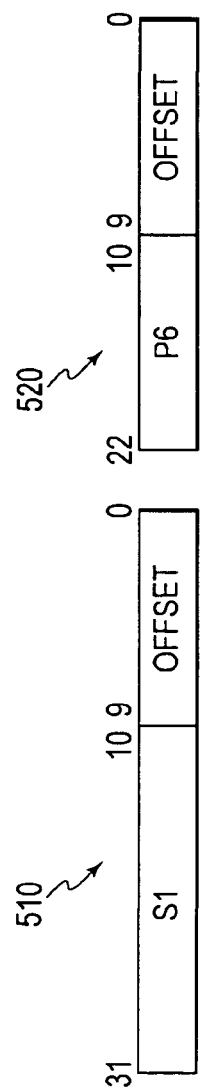
FIG. 5 shows an exemplary address translation technique.

FIG. 5 shows an exemplary address translation technique according to an embodiment of the disclosure. In a scenario, such as scenario A, the processor 110 may need to access a code in module 1, which can be stored in dynamic memory sector P6 at the time. The processor 110 may know the static memory address of the code, such as a 32 bits static memory address 510. The static memory address 510 can include a static memory sector index S1, which can be the 22 MSB, and an offset, which can be the 10 lest significant bits (LSB) in this case. According to record 440 of the exemplary hard coded TLB in FIG. 4, the static memory sector S1 and the dynamic memory sector P6 can have a mapping relationship in scenario A. Therefore, a dynamic memory address 520 of the code can be calculated by simply replacing the static memory sector index S1 of the static memory address 510 with the dynamic memory sector index P6.

FIG. 7 shows a flow chart of an exemplary address translation process that can translate a static memory address of a code into a dynamic memory address that holds the code. The process starts in step S710, and proceeds to step S720, where the controller 320 can determine a current scenario. Then the process proceeds to step S730, where the controller 320 can extract the static memory information from the static memory address. For example, in an embodiment, the hard coded TLB can map a static memory sector index with a dynamic memory sector index. Therefore, the controller 320 can extract the static memory sector index from the static memory address, such as 22 MSB of 32 bits static memory address 510.

Subsequently, the process can proceeds to step S740, where the controller 320 can locate a record in the hard coded TLB that has matching scenario and static memory index. Therefore, a dynamic memory index of the record can indicate the location of the dynamic memory 330 that holds the code.

Then, the process proceeds to step S750, where the controller 320 can calculate the dynamic memory address for the code. In an embodiment, the controller 320 can calculate the dynamic memory address by replacing the static memory index with the dynamic memory index in the static memory address, such as shown by FIG. 5. Finally, the process can proceeds to step S760, and terminates.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for managing memory, comprising:
   detecting a change from a first scenario that uses a first communication protocol to a second scenario that uses a second communication protocol in a system, the first scenario requiring execution of a first code module, and the second scenario requiring execution of a second code module, the first code module, the second code module, and a third code module co-existing in a static memory;

matching the detected second scenario with a predefined scenario that includes a pre-set mapping relationship of the second code module to a dynamic memory address within a first portion of a dynamic memory, the predefined scenario being at least based on a type of a communication port of the system, wherein the pre-set mapping relationship maps the third code module to another dynamic memory address within a second portion of the dynamic memory and the pre-set mapping relationship of the third code module stays the same independent of the change, the second portion being reserved as a performance critical portion of the dynamic memory that is unaffected by the change; and writing the second code module from the static memory to the first portion of the dynamic memory at the dynamic memory address to replace the first code module in the dynamic memory.

2. The method according to claim 1, further comprising: storing a third module at a second portion of the dynamic memory independent of the scenario change.

3. The method according to claim 1, wherein the static memory is at least one of read only memory (ROM), programmable ROM (PROM), flash PROM, electrical erasable PROM (EEPROM), magnetic storage, optical storage and battery backup random access memory (RAM).

4. The method according to claim 1, wherein the dynamic memory is at least one of DRAM and SRAM.

5. The method according to claim 1, wherein the second code module includes binary codes for causing a processor to perform a function.

6. The method according to claim 1, further comprising:
saving a hard coded translation lookaside buffer (TLB) in a non-volatile memory of the system;
representing the predefined scenario by a number included in a scenario identification field of the TLB;
associating the number with a first index included in a static memory field of the TLB and a second index included in a dynamic memory field of the TLB;
locating a first module in a static memory of the system by the first index; and
locating a second module in a dynamic memory of the system by the second index.

7. The method according to claim 1, wherein the performance critical portion of the dynamic memory is used to retain modules that are critical to a system performance as long as the system remains powered on.

8. The method according to claim 1, wherein the pre-set mapping relationship maps a static memory address of the second code module within the static memory with the dynamic memory address within the first portion of the dynamic memory.

9. The method according to claim 8, wherein writing the second code module from the static memory to the dynamic memory further comprises:
copying data stored within the static memory at the static memory address to the dynamic memory at the dynamic memory address.

10. The method according to claim 1, further comprising: executing the second code module from the dynamic memory.

11. The method according to claim 10, wherein executing the second code module from the dynamic memory further comprises:
matching the second scenario with the predefined scenario that includes the pre-set mapping relationship of a static memory address storing the second code module to the dynamic memory address within the dynamic memory; and
executing the second module stored within the dynamic memory at the dynamic memory address.

12. A method of manufacturing a computer system, comprising:
identifying a first scenario that uses a first communication protocol and a second scenario that uses a second communication protocol;
finding a first code module that is associated with the first scenario, and a second module that is associated with the second scenario, the first code module, the second code module, and a third module co-existing in a static memory;
establishing a first mapping relationship of the first code module to a dynamic memory address within a dynamic memory for the first scenario;
establishing a second mapping relationship of the second code module to the dynamic memory address for the second scenario;
establishing a third mapping relationship of the third code module to another dynamic memory address and maintaining the third mapping relationship independent of the first and second scenarios, the other dynamic memory address being reserved as a performance critical portion of the dynamic memory that is unaffected by the first and second scenarios;
storing the first scenario and the first mapping relationship as a first predefined scenario in a memory medium, and the second scenario and the second mapping relationship as a second predefined scenario in the memory medium, the first and second predefined scenarios being at least based on a type of a communication port of the computer system; and
including the memory medium with the computer system.

13. The method according to claim 12, wherein including the memory medium with the computer system, further comprises:
including instructions for causing the computer system to download a predefined scenario to update the memory medium.

14. The method according to claim 12, wherein the memory medium is part of the computer system.

15. The method according to claim 12, wherein the first code module includes binary codes for causing a processor to perform a first function, and the second code module includes binary codes for causing a processor to perform a second function.

16. A system for managing memory, comprising:
a static memory that is configured to store a first code module required in a first scenario that uses a first communication protocol at a first static memory address and a second code module required in a second scenario that uses a second communication protocol at a second static memory address, the first code module, the second code module, a third code module co-existing in the static memory;
a dynamic memory that is configured to have a first portion that stores the first code module in the first scenario and the second code module in the second scenario, the dynamic memory further configured to have a second portion that stores the third code module;

a controller that is configured to detect a scenario change from the first scenario to the second scenario, match the detected second scenario with a predefined scenario that includes a pre-set mapping relationship of the second code module to a dynamic memory address within the first portion of the dynamic memory, the predefined scenario being at least based on a type of a communication port of the system, and write the second code module from the static memory to the first portion of the dynamic memory at the dynamic memory address to replace the first code module in the dynamic memory, wherein the pre-set mapping relationship maps the third code module to another dynamic memory address within the second portion of the dynamic memory and the pre-set mapping relationship of the third code module stays the same independent of the scenario change, the second portion being reserved as a performance critical portion of the dynamic memory that is unaffected by the change.

17. The system according to claim 16, wherein the dynamic memory is further configured to have a second portion that stores a third module independent of the detected scenario change.

18. The system according to claim 16, wherein the dynamic memory is at least one of DRAM and SRAM.

19. The system according to claim 16, wherein the first code module includes binary codes for causing a processor to perform a first function, and the second code module includes binary codes for causing the processor to perform a second function.

20. The system according to claim 16, wherein the controller further comprises:
 a buffer unit that is configured to buffer the predefined scenario that includes the mapping relationship of the static memory address to the dynamic memory address.

21. The system according to claim 20, wherein the predefined scenario are stored in a memory medium, and loaded in the buffer.

22. A computer system, comprising:
 a static memory that is configured to store a first code module required in a first scenario that uses a first communication protocol at a first static memory address and a second code module required in a second scenario that uses a second communication protocol at a second static memory address, the first code module, the second code module, and a third code module co-existing in the static memory;
 a dynamic memory that is configured to have a first portion that stores the first code module in the first scenario and the second code module in the second scenario, the dynamic memory further configured to have a second portion that stores the third code module;
 a controller that is configured to detect a scenario change from the first scenario to the second scenario, match the detected second scenario with a predefined scenario that includes a pre-set mapping relationship of the second code and a dynamic memory address, the predefined scenario being at least based on a type of a communication port of the system, and write the second code module from the static memory to the first portion of the dynamic memory at the dynamic memory address to replace the first code module in the dynamic memory address, wherein the pre-set mapping relationship maps the third code module to another dynamic memory address within the second portion of the dynamic memory and the pre-set mapping relationship of the third code module stays the same independent of the scenario change change the second portion being reserved as a performance critical portion of the dynamic memory that is unaffected by the scenario change; and
 a CPU that is configured to execute the second code module from the dynamic memory.

23. The computer system according to claim 22, wherein the controller further comprises:
 a buffer unit that is configured to buffer the predefined scenario that includes the pre-set mapping relationship of the static memory address to the dynamic memory address.

24. The computer system according to claim 22, further comprising:
 a memory medium that is configured to store the predefined scenario, the controller being further configured to load the predefined scenario into the buffer.

25. The computer system according to claim 22, wherein the dynamic memory is further configured to have a second portion that stores a third code module independent of the detected scenario change.

26. The computer system according to claim 22, wherein the first code module includes binary codes for causing a processor to perform a first function, and the second code module includes binary codes for causing a processor to perform a second function.

27. An application specific device having an embedded system, comprising:
 a static memory that is configured to store a first code module required in a first scenario that uses a first communication protocol at a first static memory address and a second code module required in a second scenario that uses a second communication protocol at a second static memory address, the first code module, the second code module, and a third code module co-existing in the static memory;
 a dynamic memory that is configured to have a first portion that stores the first module in the first scenario and the second code module in the second scenario, the dynamic memory further configured to have a second portion that stores the third code module;
 a controller that is configured to detect a scenario change from the first scenario to the second scenario, match the detected second scenario with a predefined scenario that includes a pre-set mapping relationship of the second code module to a dynamic memory address, the predefined scenario being at least based on a type of a communication port of the embedded system, and write the second code module from the static memory to the first portion of the dynamic memory at the dynamic memory address to replace the first code module in the dynamic memory, wherein the pre-set mapping relationship maps the third code module to another dynamic memory address within the second portion of the dynamic memory and the pre-set mapping relationship of the third code module stays the same independent of the scenario change, the second portion being reserved as a performance critical portion of the dynamic memory that is unaffected by the scenario change;
 a CPU that is configured to execute the second code module from the dynamic memory; and
 a device specific component that is coupled with the CPU and is configured to execute a device specific function under control of the CPU.

28. The application specific device according to claim 27, wherein the controller further comprises:
   a buffer unit that is configured to buffer the predefined scenario that includes the pre-set mapping relationship of the second static memory address to the dynamic memory address.

29. The application specific device according to claim 27, wherein the dynamic memory is further configured to have a second portion that stores a third module independent of the detected scenario change.

30. The application specific device according to claim 27, wherein the static memory stores altogether the first code module required for communication via Ethernet, and the second code module required for communication via USB.

* * * * *